United States Patent
Billemaz et al.

(10) Patent No.: US 7,072,813 B2
(45) Date of Patent: Jul. 4, 2006

(54) MECHANISM TO SYNCHRONIZE PROBES DURING SIMULATION OF SYSTEM-LEVEL DESIGNS

(75) Inventors: Marc Billemaz, Fresnes (FR); Pascal Bornat, Clamart (FR); Jean-Yves Brunel, Paris (FR)

(73) Assignee: Cadence Design Systems, Inc., San Jose, CA (US)

( * ) Notice: Subject to any disclaimer, the term of this patent is extended or adjusted under 35 U.S.C. 154(b) by 753 days.

(21) Appl. No.: 10/294,241

(22) Filed: Nov. 13, 2002

(65) Prior Publication Data

US 2004/0093197 A1    May 13, 2004

(51) Int. Cl.
*G06F 9/45*   (2006.01)
*G06F 17/50*  (2006.01)
*G06G 7/48*   (2006.01)

(52) U.S. Cl. .................. 703/6; 703/17; 716/5
(58) Field of Classification Search ............ 703/6, 703/17; 716/5
See application file for complete search history.

(56) References Cited

OTHER PUBLICATIONS

Choy et al.; Test generation with dynamic probe points in high observability testing environment; pp. 88-96; IEEE Trans. Computers; Jan. 1996.*

DeRose et al.; The dynamic probe class library-an infrastructure for developing instrumentation for performance tools; 7 pages; IEEE Proc. 15th Inter. Parallel and distributed rpocessing symp.; Apr. 2001.*

* cited by examiner

*Primary Examiner*—Hugh Jones
(74) *Attorney, Agent, or Firm*—Bingham McCutchen LLP

(57) ABSTRACT

In system design simulators, probes are software objects that collect data from simulated system components. A probe synchronization method and device are used to collect simulation data from the components during a period of interest. For example, a given event that occurs during the simulation may signal the beginning of the period, and another event may signal the end of the period. An acquisition window having a starting point and an ending point coinciding with the occurrence of the events may be used by a probe master to cause one or more probes to collect data during this period of interest. A unique Identifier or Tag of this period of interest is generated by the Probe Master and sent to all the slave probes. This Tag is dumped in the simulation database. It allows post-processing correlations between high-level simulation events and low-level model reactions.

30 Claims, 6 Drawing Sheets

Bus Arbitration Table

Bus Read Transactions | Bus Write Transactions

| Read Counter | Read Trans Size | readDelay Sum | Write Counter | Write Trans Size | Write Delay Sum | preempt Count |
|---|---|---|---|---|---|---|
| 1 | 2208 | 1.00000004E-08 | 0 | 0 | 0 | 0 |
| 1 | 192 | 1.9343750E-06 | 0 | 0 | 0 | 0 |
| 1 | 32 | 1E-08 | 0 | 0 | 0 | 0 |
| 0 | 0 | 0 | 1620 | 10368000 | 7.210350DE-05 | 0 |
| 1 | 2208 | 1E-08 | 0 | 0 | 0 | 0 |
| 1 | 192 | 1E-08 | 0 | 0 | 0 | 0 |
| 1 | 32 | 1.0000000E-08 | 0 | 0 | 0 | 0 |
| 0 | 0 | 0 | 1620 | 10368000 | 2.0193E-05 | 0 |

FIG. 7

MECHANISM TO SYNCHRONIZE PROBES DURING SIMULATION OF SYSTEM-LEVEL DESIGNS

BACKGROUND OF THE INVENTION

Electronic design automation tools help assess a design of an electronic system in terms of its functionality, performance, and cost. A virtual electronic system used by the automation tools is generally composed of functional models, communication models, and architectural models. Each of these models is associated with a specific performance model. Virtual architecture components are usually implemented as services with one or more layers. In this context, evaluating a single implementation of an embedded system requires considering data from a simulation of a large number of design items characterized by a large number of metrics. It rapidly becomes impossible to collect information about the items at every clock tick during the simulation, then correlate the collected information from different levels and designs during post-processing analysis.

An application program for a system-level design, such as a video system for example, produces Gigabytes of data during simulation runs. Also, the number of input-output (I/O) operations needed to collect this data often makes the speed of the simulation impractical. There is a need for reference keys that would uniquely identify the execution contexts of execution at the application-level. There is also a need to perform in-depth analysis of models based on the relationship between events that occur in a system's high level design and their decomposition into multiple reactions of lower-level system components by propagating trigger signals to potentially all models However, a commonly accepted system design paradigm assumes a clear separation between functional and performance models, as well as an orthogonal arrangement of architecture services. Therefore, the conventional paradigm does not facilitate the vertical propagation of triggering signals through several layers of models.

For example, a probing capability already exists in modem simulators, but the probes are time driven. They cannot be synchronized dynamically, but instead are synchronized statically prior to a simulation. The probes usually collect data during the entire simulation, from beginning to end. Sometimes, the activation of the probe is delayed by a given amount of time after the start time to postpone the probe activation. An end time can also be set to stop the probe from collecting data before the end of the simulation. However, these data collection periods are fixed prior to executing the simulation. Therefore, the probes cannot be controlled by events that occur during a simulation run. Also, it is not possible to clearly define different levels of probing using existing methods. Output data cannot be correlated with functional events. Furthermore, seamless probing through several service layers during a simulation of a system is not possible because of a probe's lack of synchronization to other probes and a lack of a common reference for the probes.

SUMMARY OF THE INVENTION

A method of synchronizing probes that collect data samples from resources during a simulation of a system design is disclosed. In one embodiment, the method includes sending a signal to indicate an occurrence of a triggering event from one of the system design resources to a first probe master, and sending a start action signal from the first probe master to a plurality of slave probes to cause the slave probes to simultaneously start collecting data samples from one or more system design resources.

BRIEF DESCRIPTION OF THE DRAWINGS

FIGS. 6 and 7 show examples of data samples collected by the probe-synch mechanism.

DETAILED DESCRIPTION

A probe synch mechanism allows users to uniquely identify application level execution contexts of data samples gathered during a simulation of a system. The probe synch mechanism can be used to perform in-depth analysis of simulated models of an electronic system based on the relationship between the system's high-level events and their decomposition into multiple reactions of lower-level system components by propagating trigger signals to a cluster of probes. A probe master (PM) propagates action signals to a set of slave probes (SPs) simultaneously to guarantee actual synchronization of the distributed probes. The action signals define clear boundaries for a given session of data acquisition by the slave probes. The set of SPs derive from a common model which enforces the synchronization mechanism for the probes. Three levels of probing may be performed, i.e. probing at the functional level, the system communication level, and the architectural level. Data gathered from each of these levels provides specific functional, performance, and resource utilization information about the system model during the simulation. This information may be collected by distinctly and simultaneously measuring architecture services for both body functionality and system communications.

Simulation trigger events are caused by the behavior of components in the functional, communication, or architectural resources of the system model. A probe master (PM) is attached to a component that causes a trigger event. The PM is also attached to multiple slave probes (SPs) that are distributed in separate instances of system models. The event causes the PM to drive the probing by simultaneously sending an action signal to multiple SPs. The SPs are synchronized to simultaneously perform one of several data processing actions associated with the action signal, such as start, stop, flush, and abort for example. The SPs tag the data with a unique reference key to identify a period of time during which the data was collected. The data collected during this period can then be identified and analyzed after the simulation has finished.

Thus, the probe synch mechanism can control the acquisition of measurements about performance utilization of resources distributed throughout the simulated system, from the upper functional level, through the communications level, to the lower architectural layers. The operation of the mechanism has a minimal impact on the performance of the simulation, because the SPs collect data during the acquisition window, and store the data after data acquisition window has closed. The system does not need to pause the simulation or the collection of data by the SPs to flush the data into storage.

Figure 1:
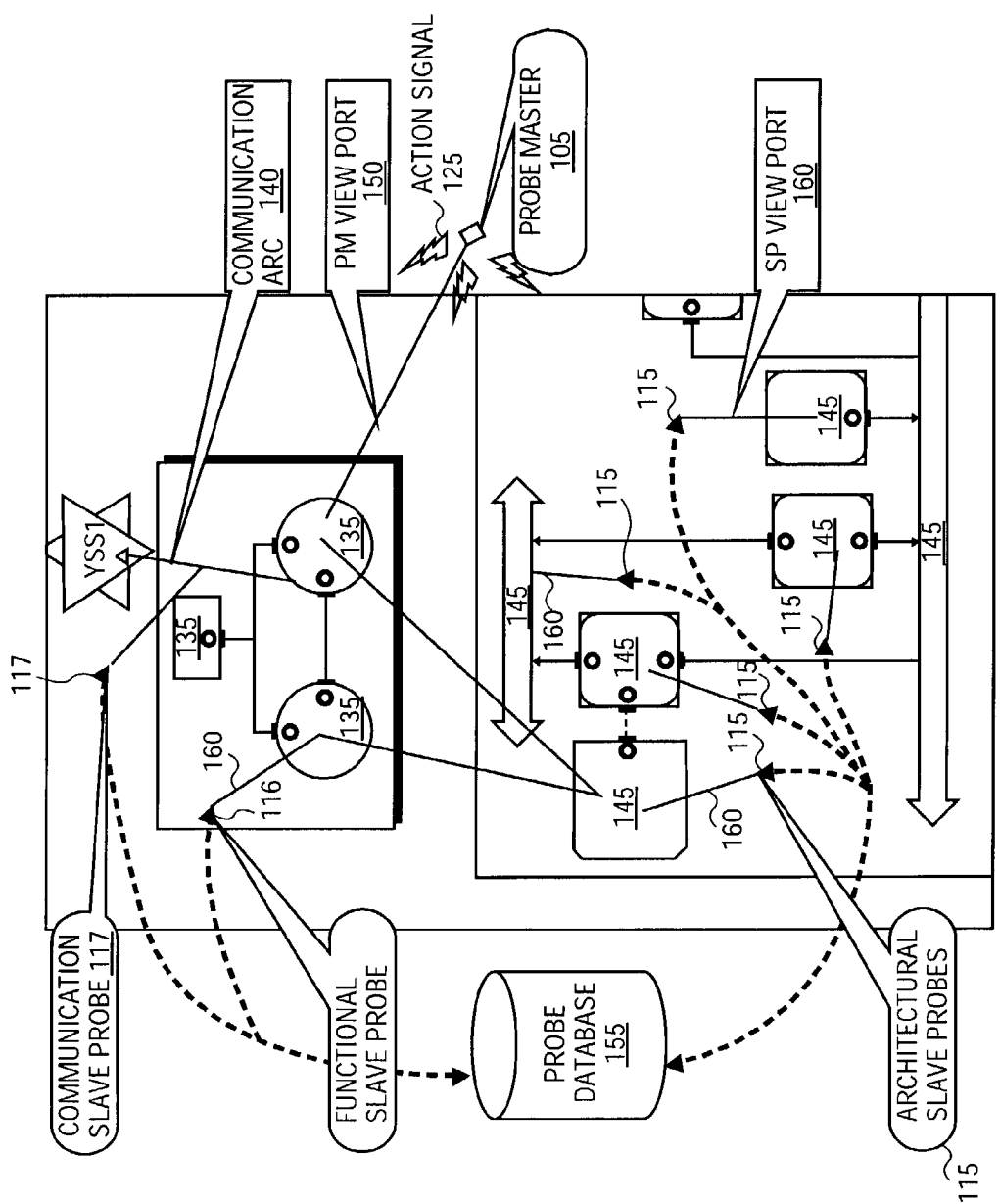
FIG. 1 shows an example of a probe-synch mechanism.

An example of a probe synch mechanism is shown in FIG. 1. A start event occurs at a simulation model of a resource. Examples of events include a beginning of processing a new data token, an end of processing for a data token, a simulation time (either an absolute or a relative value), a protocol condition in a communication resource (e.g. FIFO full/stall), or a system call in an architectural resource, such as write( ), read( ), or memcpy( ).

After receiving through view port 150 an indication from the simulation model that the event has occurred, the PM 105 immediately notifies architectural SPs 115, functional SP 116, and communication SP 117 by simultaneously asserting a start action signal 125 through a new synchronization software based on the Subject/Observer Pattern to the SPs that are attached to it. The start signal marks the beginning of the data acquisition period associated with the start event. The SPs then simultaneously begin recording data from their corresponding components, including data from functional models 135, communication model 140, and architectural models 145. Each SP receives data from its component through its SP view port 160.

The start signal 125 also causes a unique reference key for the acquisition window to be created. For example, the unique key may be created by incrementing a counter whenever a start event occurs. The key uniquely identifies an application-level execution context of the data samples collected during this data acquisition period, irrespective of time e.g. the 42nd MPEG frame of a video in an MPEG decoder.

The probes continue collecting data until another event, such as a stop, abort, or flush event occurs. When a stop event signal is received by the PM, the PM sends a stop action signal to the SPs. In response, the SPs simultaneously stop collecting data from their components during the simulation of the system. A flush action signal causes the SPs to store the collected data and the data's unique identifier in a relational database 155. An abort signal causes the SPs to stop recording data without causing the event identifier to change when another event occurs.

Other action signals may also be used. For example, the data extraction efficiency of the probe-synch may be improved by using a PM scheduler to send action signals at predetermined times. A deferred start signal may be used to collect samples at a given time, such as a delay time added to the current time. A deferred stop action signal may be used to stop sample collection at a given time. A periodic acquisition signal may be used to periodically collect data samples. A stop periodic acquisition signal may stop periodic collection after a given number of periods. Also, the PM may perform logic tests on trigger conditions and events, so that an action signal is sent only when a combination of events occur (e.g. fifo full on the 30th MPEG frame). The logic tests may be AND, OR, or XOR, for example.

The PM action signal may contain several fields. Examples of the fields are shown in Table 1.

TABLE 1

Fields of a probe master action signal.

| | |
|---|---|
| Action Identifier (ID): | <Start, Stop, Abort, Flush> address of the caller object embodying the behavior that caused the event to occur. |
| Event Type: | an arbitrary string naming what is used by the PM as event e.g. "EndOfFrame," "Time," or "Fifo Full," for example. |

TABLE 1-continued

Fields of a probe master action signal.

| | |
|---|---|
| Event Id: | defines a new unique session of acquisition. This parameter allows the SP to tag each database sample unambiguously for later post-processing. Event Id is incremented when a Start action signal is sent from the PM. |
| Requestor Name: | string name of the PM owner block. |

Figure 2:
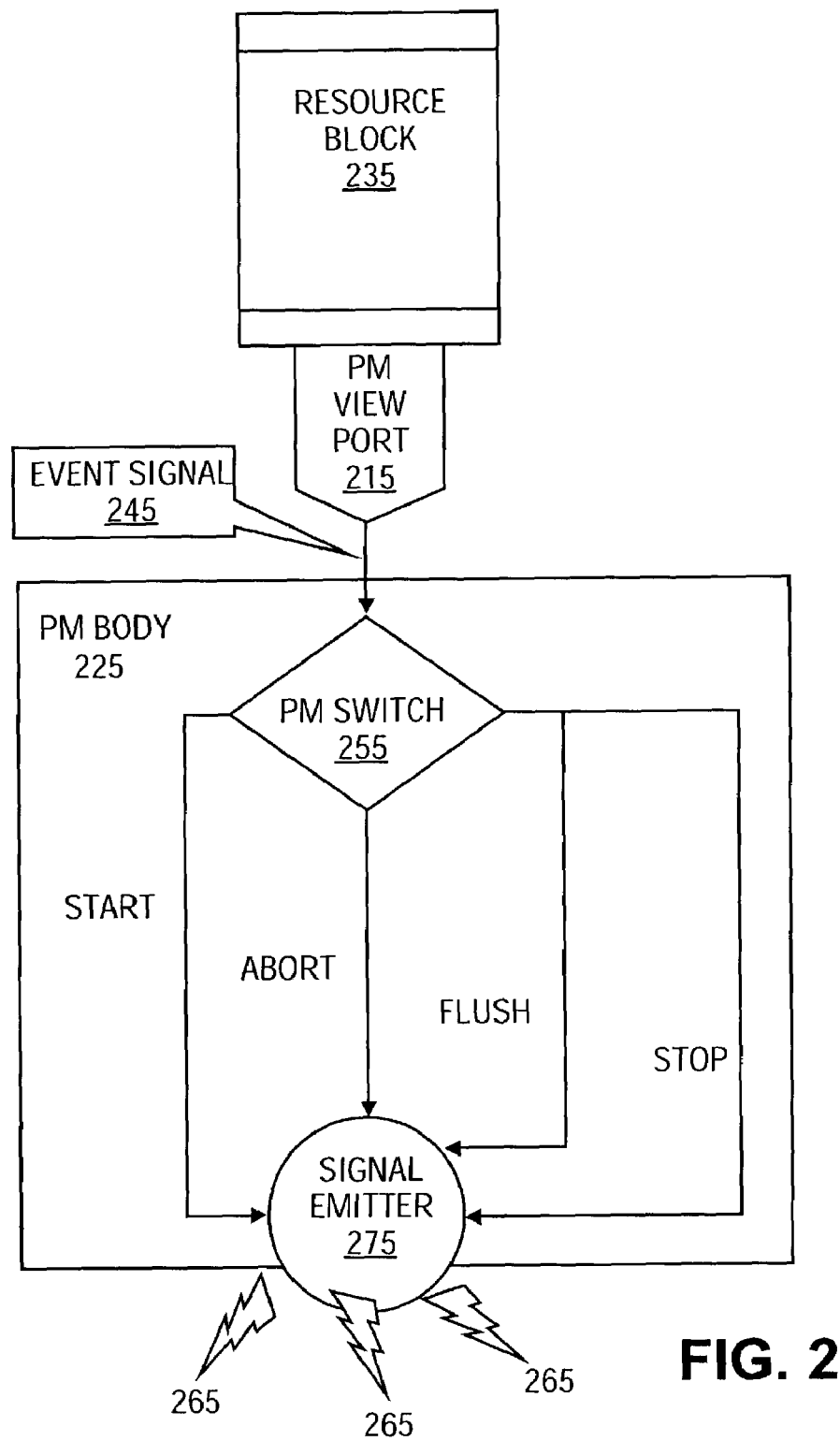
FIG. 2 shows an example of a probe master used in the probe-synch mechanism.

FIG. 2 shows an example of a probe master. A view port 215 establishes a communication channel between the probe master 225 and a resource block 235 of the system. The resource block may be software, which when executed by a processor, simulates the behavior of a functional, architectural, or communication component of an integrated system design. When the behavior of block 235 causes an event to occur, an event signal 245 is sent to the PM. The event is associated with one of several PM action signals, such as start, abort, flush, and stop, for example. The PM identifies the event and broadcasts the corresponding event action signal to the SPs that are associated with the PM. For example, the event signal 245 may be input to switch 255. The switch identifies the action signal associated with the event signal, and causes signal emitter 275 to send the appropriate action signal 265 to the SPs.

Figure 3:
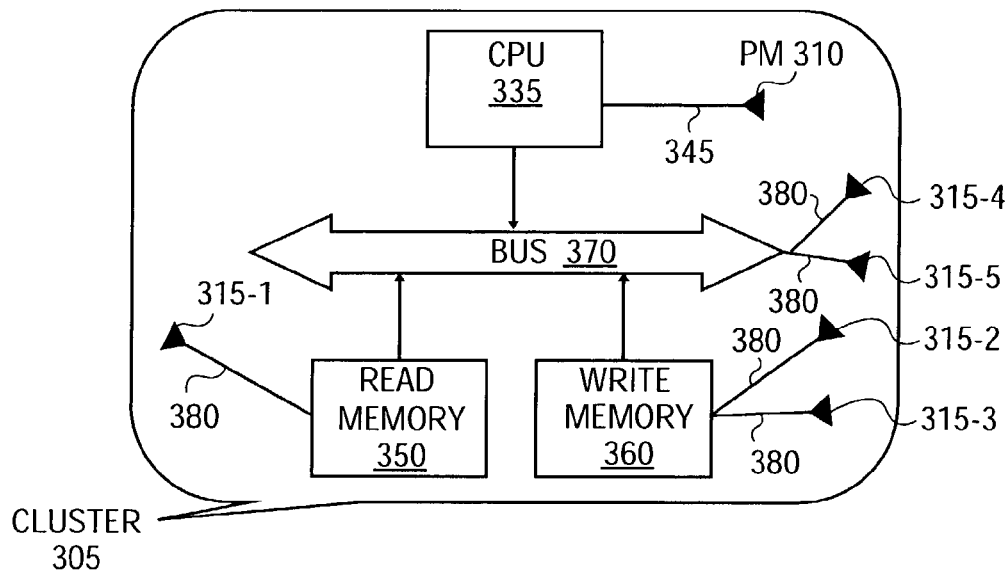
FIGS. 3 and 4 show examples of clusters of probes that implement the probe-synch mechanism.

Multiple SPs may collect data from the same resource, as shown in the example of FIG. 3. A cluster of probes 305 are synchronized to simultaneously monitor architectural resources is shown in FIG. 3. One PM 310 is used to control a number of SPs 315 that are attached to various architectural resources. The PM controls the SPs simultaneously and remotely in response to trigger events. One SP may be associated with one resource. For example, SP 315-1 is associated with the model of memory 350. In this example, data is read from memory 350 in response to a read command. SP 315-1 records data about the memory's performance. Alternatively, several SPs may be associated with one resource. For example, SPs 315-2 and 315-3 are associated with the model of memory 360. Data is written to memory 360 in response to a write command. SPs 315-2 and 315-3 collect data from memory 360 to measure the performance of memory 360. SPs 315-4 and 315-5 are associated with bus 370 and record performance data about the simulation of bus 370.

The PM monitors the behavior of a model of central processing unit (CPU) 335 to detect an occurrence of a start event, such as a read from memory command, for example. When the event occurs, an event occurrence signal is sent from the CPU model to the PM across view port 345. The PM then sends a corresponding action signal, which is a start signal in this case, to the SPs. The start action signal synchronizes the SPs so that they begin recording data simultaneously through view ports 380. Also, a unique identifier is created and associated with the data that is collected during this recording session or acquisition window.

When a second event occurs, the PM sends an action signal associated with the event to the SPs. In this example, the second event is a write to memory command, and is associated with a stop action signal. When the CPU causes the write command to occur, a stop signal is sent from the PM to the SPs. The stop signal causes the SPs to simultaneously stop recording data from the resources and to store the recorded data and its unique identifier in a database. After the simulation is over, the recorded data can be retrieved by using the unique identifier, then analyzed to determine an intrinsic delay between the read and write commands.

Figure 4:
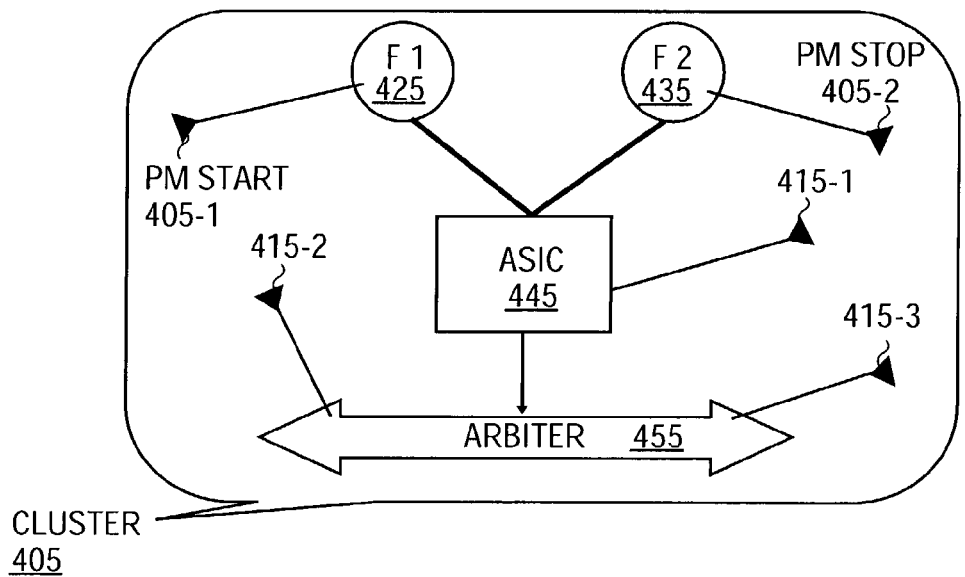

Multiple PMs may be used to send action signals, as shown in the example of FIG. 4. A cluster of probes 405 monitors behavioral resources of a system design design during a simulation. Two PMs 405-1 and 405-2, control a number of SPs 415. PM 415-1 is associated with behavioral block 425, where the start event occurs. PM 405-1 sends a start signal to SPs 415 in response to the occurrence of the start event. A unique identifier is generated and associated with the data collected by the SPs during this recording session. The SPs are synchronized to simultaneously collect data until they receive another control signal. SP 415-1 records data about an ASIC model 445. SPs 415-2 and 415-3 record data about a bus arbiter 455. PM 405-2 is associated with behavioral block 435, where the terminating event occurs. After detecting the stop event, PM 405-2 sends a stop signal to the SPs, which then simultaneously stop collecting data. This data, along with the corresponding unique identifier, is stored in a database. The recorded data associated with these start and stop events can be retrieved from the database and analyzed. For example, a communication latency between blocks 425 and 435 can be determined by post-processing analysis of this data.

In one embodiment, when multiple PMs are used to synchronize a cluster of probes, consistent responses by the probes to the action signals are guaranteed as long as synchronization rules are followed inside of the probe synch cluster. For example, the following synchronization rules may be used. A PM can send different action signals as time goes by, i.e. start, stop, start. The event identifier is incremented only by the start action signal. To avoid a duplicate acquisition session in the cluster, the start signal is sent by only one PM, so that the event identifier is incremented in a unique place. Several PMs can send stop, flush or abort action signals. If several PMs send similar action signals, the receiving SP takes the first action signal into account and ignores the other signals. In other embodiments, other synchronization rules may be used.

PM and SP declaration in a simulator can identify probes that are available to form a cluster. A cluster includes multiple SPs and one or more PMs having the same probe group identifier. The cluster of probes is created by associating one or more SPs with one or more PMs. A service registry, which is a place where different objects can store their handles, may be used to associate the PMs and SPs into a cluster. SPs that register their handles in a service registry share a probe group identifier that uniquely identifies the service registry. The PM can form a cluster by automatically retrieving the SP instances that have the same probe group identifier and attaching itself to them. In the cluster, the SPs can be different types of probes (e.g. Memory, Bus, or CPU probes). Several independent clusters of probes can gather data during a simulation. For example, one cluster of probes may measure data from an "End Of Frame" stage, one cluster may measure data for an "image" (an arbitrary number of frames), and one may monitor an MPEG 'P' frame processing.

A view port (VP) is a virtual port that creates a communication channel between two objects of the simulator. In the probe synch mechanism, VPs are used to send event occurrence signals to a probe master and to write data to slave probes. A behavioral block can send an event occurrence signal to a PM by declaring a view port associated with the event. A probed resource (such as a functional or architectural resource) declares a view port, or communication channel, between itself and its slave probe. The resource code is then executed, the resource is simulated, and a write is done across the view port, from the resource to the probe, to record the behavior that the probe is monitoring. Information about the behavior is sent to the probe in a composite type of data structure that includes a header and a body.

The header is a structure of fields identifying the resource object it represents, e.g. a bus. The body is a structure of fields that characterizes the specific performance of the resource, e.g. FCFS bus. An example of a bus slave probe view port input header and body is given in Table 2.

TABLE 2

An example of a header and a body for a slave probe.

| HEADER | | |
|---|---|---|
| SAMPLE_NUM | Unsigned | Rank of dump in database (db), set by the db API |
| Tnow | Double | Actual time of dump in db, set by db API |
| ResourceName | string | Name of the port, architectural or pattern service |
| VccInstanceName | string | Name of the behavioral block or architectural resource |
| VccInstanceID | int | Unique identifier of the Vcc Instance |
| SessionCounter | int | Acquisition session identifier |
| BODY | | |
| readCounter | int | Number of memo read transactions |
| readTransSizeSum | int | Size in bits of the read transactions |
| readDelaySum | double | Sum of the memo read transactions delays (intrinsic) |
| writeCounter | int | Number of memory write transactions |
| writeTransSizeSum | int | Size in bits of the write transactions |
| writeDelaySum | double | Sum of the memo write transactions delays (intrinsic) |

Table 3 shows several types of probes and their corresponding services and resources. This example shows the minimum system resources to probe, resulting in efficient, reliable and complete simulation instrumentation. A slave probe may be dedicated to a code block or a service, and may be used by several resources.

TABLE 3

Types of probes to gather data for services and resources.

| Probe Type | Block/Service | Resource |
|---|---|---|
| Behavior measurable property | Basic functional block | Behavior element |
| Communication statistics | Communication service | Communication channel |
| Execution delay | Archit. exec. delay service | ASIC, Processor |
| Cache memory statistics | Cache memory service | Processor |
| Memory segments statistics | Memory Access service | Processor |
| Memory delay and statistics | Memory service | Memory, Processor, ASIC |

TABLE 3-continued

Types of probes to gather data for services and resources.

| Probe Type | Block/Service | Resource |
| --- | --- | --- |
| Scheduler statistics | Scheduler service | ASIC, Processor, RTQS |
| Bus arbitration | Bus Adapter service | Processor, ASIC, Bus Bridge |
| ASIC Pipeline execution delay | ASICPipe exec. delay service | ASIC pipeline |

The SP receives formatted data through the view port and processes the information based on action signals. In addition, the SP can process the information in real time to reduce the amount of data that is subsequently stored in a database of simulation results, and to reduce the amount of time needed to perform the simulation. For example, the SP may execute operations, such as count, sum, and average, for example, on each of the sample fields in the data sample. The SP may use the signal ID field (e.g. "start", "stop", "flush", abort") as a table index key to uniquely identify the data structure thus speeding the subsequent data retrieval. The samples are stored by the probe until the end of an acquisition session. Then, the data samples are moved into the database.

Figure 5:
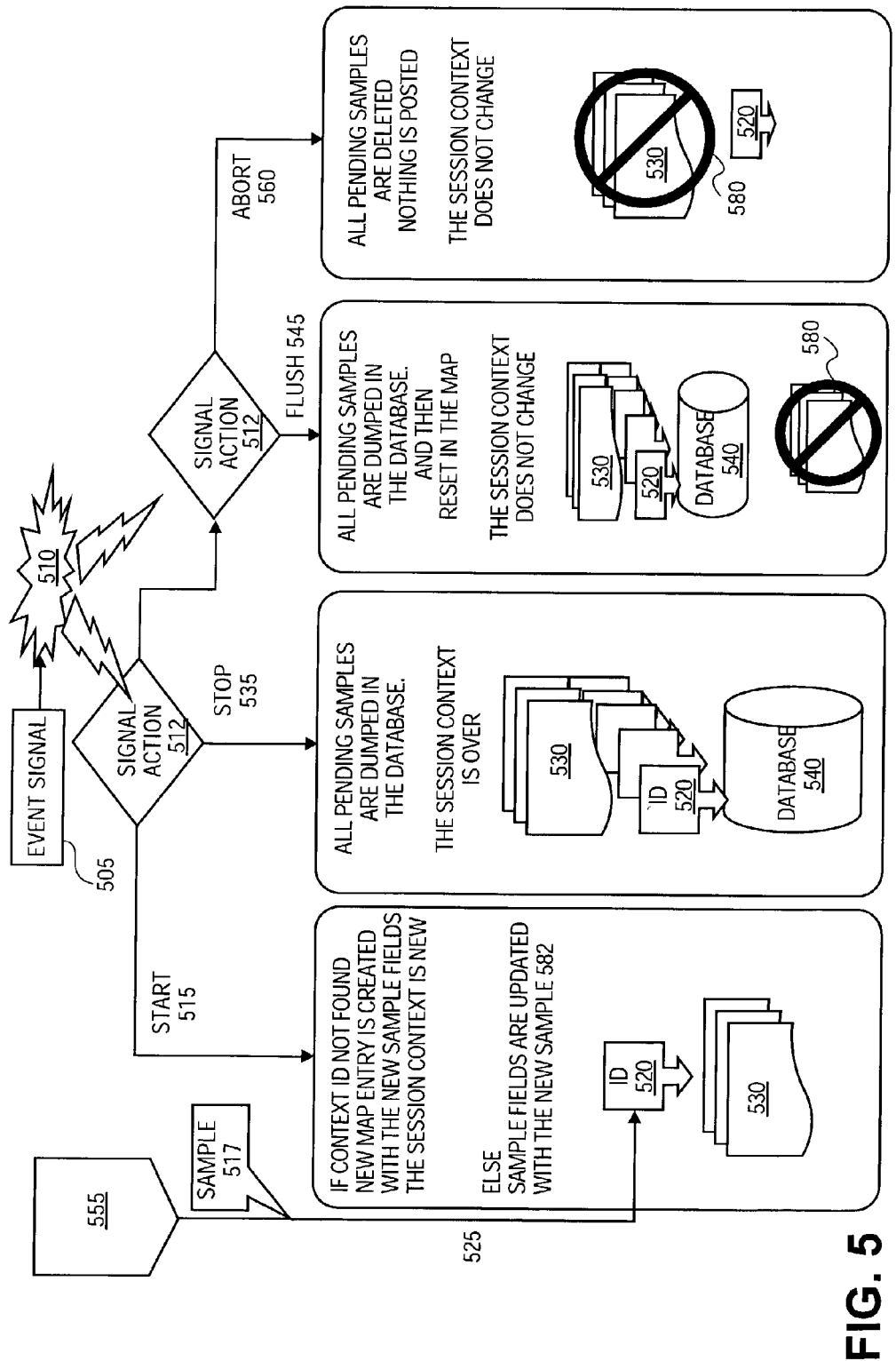
FIG. 5 shows an example of functions performed by a slave probe in the probe-synch mechanism.

FIG. 5 shows an example of a slave probe functional diagram. An event occurrence signal 505 is sent to a PM 510. The PM identifies the action signal for the event 512. If the event is a start event, the PM sends a start action signal 515 to the SP to signal the start of a new data acquisition period. The SP creates a new map entry for a new data structure including blank sample fields to provide a unique identifier or session context, 520, for the data structure of the new data sampling period. The probed resource 555 sends data samples 517 through the view port 525 to the SP. The sample fields of the data structure 530 in the probe are updated as new data samples are received.

If the event that occurs is a stop event, the PM sends a stop action signal to the SP, 535. The SP sends the identifier 520 and data samples stored in the data structure 530 to the simulation results database, 540, and the data sampling period is over.

If the event is associated with a flush, the PM sends a flush signal to the SP, 545. The data samples and are sent to the results database, 540. The SP then resets the map so that the fields of the data structure 530 are empty, the unique identifier for the data structure 520 remains the same, and the data sampling period continues. The data structure records new data samples received after the flush command.

If the PM receives an indication that an abort event has occurred, the PM sends an abort signal to the SP, 560. The data samples are deleted from the data structure 530 and the sampling period continues. The data structure records the subsequent data samples that it receives after the abort signal. Also, the identifier 520 remains the same.

In general, an SP behaves by applying an action signal to all samples currently stored in the SP's map, or data structure. The SP generally processes one PM signal at a time, in a first-in, first-out (FIFO) order, and ignores redundant signals. Other SP behavioral rules may be used by various embodiments of probe synchronization.

Figure 6:

Examples of the information that is stored in the simulation results database are shown in FIGS. 6 and 7. FIG. 6 shows an example of the content of a header of an SP after a simulation. This header is a generic header, and the fields may be common to the data structures from all of the probes. The SAMPLE_NUM field shows the rank of the data dump from the slave probe to the simulation results database (db), and may be set by the db API. The Tnow field is for the actual time that the data was dumped from the probe to the results db, and may be set by the db API. The ResourceName field is a string to identify the name of the port, architectural service, or pattern service of the resource that owns the probe master. The VccInstanceName field is for the name of the behavioral block or architectural resource that was probed. The VccInstanceID field is a unique identifier of the Vcc instance. This field provides the instance name of the service requester, has one line per instance name, and one instance name per session. The SessionCounter identifies data samples taken from the same acquisition session.

FIG. 7 shows an example of the body of an SP after a simulation. The fields in the body may be fields for a specific type of probe. For example, the fields in the body as shown in FIG. 7 are from a bus arbitration probe. The readCounter records the number of memo read transactions of a sampling period. The readTransSizeSum field records the size in bits of the read transactions. The readDelaySum field is for the sum of the memo read transactions delays (intrinsic), for the transactions arbitration delay. The writeCounter field records the number of memory write transactions in an acquisition period. The writeTransSizeSum is for the size in bits of the write transactions. The writeDelaySum field is the sum of the memo write transactions delays (intrinsic). Other fields may be used by other probes to record information about other simulated components, such as processors, memory devices, or ASIC pipelines for example. Post-processing of the database information can be done using external tools such as Excel, Access, or MathLab, for example.

The probe synch allows a database to collect a large amount of simulation data while reducing the simulation performance penalty. The probe synch is lightly intrusive, and may be used in systems that add a view port property on each object to probe. The probe synch is versatile, easy to configure, easy to use, and allows probe clustering.

These and other embodiments of the present invention may be realized in accordance with the above teachings and it should be evident that various modifications and changes may be made to the above described embodiments without departing from the broader spirit and scope of the invention. The specification and drawings are, accordingly, to be regarded in an illustrative rather than restrictive sense and the invention measured only in terms of the claims.

The invention claimed is:

1. A method of synchronizing probes of one or more system design resources during a simulation of a system design comprising:

sending a signal to indicate an occurrence of a start event from one of the system design resources to a first probe master; and sending a start action signal from the first probe master to a plurality of slave probes to cause the slave probes to simultaneously start collecting data samples from one or more system design resources.

2. The method of claim 1 further comprising:
sending a signal indicating an occurrence of a stop event from one of the system design resources to the first probe master; and
sending a stop action signal from the first probe master to the slave probes to cause the slave probes to simultaneously stop collecting data samples and to store the data samples in a database.

3. The method of claim 2 further comprising:
tagging the data samples collected during a first collection period from the occurrence of the start event to the occurrence of the stop event with a unique identifier for the first collection period.

4. The method of claim 3 further comprising:
completing the simulation of the system design; and
identifying the data samples collected during the first collection period based on the unique identifier.

5. The method of claim 4 further comprising:
correlating the identified data samples with the start and stop events of the first collection period.

6. The method of claim 1 further comprising:
associating at least one slave probes with one system design resource; and
causing the at least one slave probes to simultaneously start collecting data samples from the one system design resource.

7. The method of claim 1 further comprising:
sending a signal indicating an occurrence of a stop event from one of the system design resources to a second probe master; and
sending a stop action signal from the second probe master to the slave probes to cause the slave probes to simultaneously stop collecting data samples and to store the data samples in a database.

8. The method of claim 1 further comprising:
sending a signal to indicate an occurrence of a flush event from one of the system design resources to the first probe master; and
sending a flush action signal from the probe master to the slave probes to cause the slave probes to simultaneously store the data samples in a database.

9. The method of claim 1 further comprising:
sending a signal to indicate an occurrence of an abort event from one of the system design resources to the first probe master; and
sending an abort action signal from the probe master to the slave probes to cause the slave probes to simultaneously delete the data samples.

10. The method of claim 1 wherein sending the start action signal further comprises:
causing a first slave probe to start collecting data samples from a functional model of a resource;
causing a second slave probe to start collecting data samples from a communications model of the resource; and
causing a third slave probe to start collecting data samples from an architectural model of the resource.

11. An article of manufacture comprising a computer readable medium storing instructions which, when executed by a processing system, cause the system to perform a method of synchronizing probes of one or more system design resources during a simulation of a system design comprising:
sending a signal to indicate an occurrence of a start event from one of the system design resources to a first probe master; and
sending a start action signal from the first probe master to a plurality of slave probes to cause the slave probes to simultaneously start collecting data samples from one or more system design resources.

12. The medium of claim 11 further comprising instructions which, when executed, cause the system to perform:
sending a signal indicating an occurrence of a stop event from one of the system design resources to the first probe master; and
sending a stop action signal from the first probe master to the slave probes to cause the slave probes to simultaneously stop collecting data samples and to store the data samples in a database.

13. The medium of claim 12 further comprising instructions which, when executed, cause the system to perform:
tagging the data samples collected during a first collection period from the occurrence of the start event to the occurrence of the stop event with a unique identifier for the first collection period.

14. The medium of claim 13 further comprising instructions which, when executed, cause the system to perform:
completing the simulation of the system design; and
identifying the data samples collected during the first collection period based on the unique identifier.

15. The medium of claim 14 further comprising instructions which, when executed, cause the system to perform:
correlating the identified data samples with the start and stop events of the first collection period.

16. The medium of claim 11 further comprising instructions which, when executed, cause the system to perform:
associating at least one slave probes with one system design resource; and
causing the at least one slave probes to simultaneously start collecting data samples from the one system design resource.

17. The medium of claim 11 further comprising instructions which, when executed, cause the system to perform:
sending a signal indicating an occurrence of a stop event from one of the system design resources to a second probe master; and
sending a stop action signal from the second probe master to the slave probes to cause the slave probes to simultaneously stop collecting data samples and to store the data samples in a database.

18. The medium of claim 11 further comprising instructions which, when executed, cause the system to perform:
sending a signal to indicate an occurrence of a flush event from one of the system design resources to the first probe master; and
sending a flush action signal from the probe master to the slave probes to cause the slave probes to simultaneously store the data samples in a database.

19. The medium of claim 11 further comprising instructions which, when executed, cause the system to perform:
sending a signal to indicate an occurrence of an abort event from one of the system design resources to the first probe master; and
sending an abort action signal from the probe master to the slave probes to cause the slave probes to simultaneously delete the data samples.

20. The medium of claim 11 further comprising instructions which, when executed, cause the system to perform sending the start action signal by:

causing a first slave probe to start collecting data samples from a functional model of a resource;

causing a second slave probe to start collecting data samples from a communications model of the resource; and causing a third slave probe to start collecting data samples from an architectural model of the resource.

21. An apparatus for synchronizing probes of one or more system design resources during a simulation of a system design comprising:

means for sending a signal to indicate an occurrence of a start event from one of the system design resources to a first probe master; and means for sending a start action signal from the first probe master to a plurality of slave probes to cause the slave probes to simultaneously start collecting data samples from one or more system design resources.

22. The apparatus of claim 21 further comprising:

means for sending a signal indicating an occurrence of a stop event from one of the system design resources to the first probe master; and means for sending a stop action signal from the first probe master to the slave probes to cause the slave probes to simultaneously stop collecting data samples and to store the data samples in a database.

23. The apparatus of claim 22 further comprising:

means for tagging the data samples collected during a first collection period from the occurrence of the start event to the occurrence of the stop event with a unique identifier for the first collection period.

24. The apparatus of claim 23 further comprising:

means for completing the simulation of the system design; and means for identifying the data samples collected during the first collection period based on the unique identifier.

25. The apparatus of claim 24 further comprising:

means for correlating the identified data samples with the start and stop events of the first collection period.

26. The apparatus of claim 21 further comprising:

means for associating at least one slave probes with one system design resource; and means for causing the at least one slave probes to simultaneously start collecting data samples from the one system design resource.

27. The apparatus of claim 21 further comprising:

means for sending a signal indicating an occurrence of a stop event from one of the system design resources to a second probe master; and means for sending a stop action signal from the second probe master to the slave probes to cause the slave probes to simultaneously stop collecting data samples and to store the data samples in a database.

28. The apparatus of claim 21 further comprising:

means for sending a signal to indicate an occurrence of a flush event from one of the system design resources to the first probe master; and means for sending a flush action signal from the probe master to the slave probes to cause the slave probes to simultaneously store the data samples in a database.

29. The apparatus of claim 21 further comprising:

means for sending a signal to indicate an occurrence of an abort event from one of the system design resources to the first probe master; and means for sending an abort action signal from the probe master to the slave probes to cause the slave probes to simultaneously delete the data samples.

30. The apparatus of claim 21 wherein said means for sending the start action signal further comprises:

means for causing a first slave probe to start collecting data samples from a functional model of a resource;

means for causing a second slave probe to start collecting data samples from a communications model of the resource; and means for causing a third slave probe to start collecting data samples from an architectural model of the resource.

* * * * *